United States Patent

Mills

[11] Patent Number: 5,551,510
[45] Date of Patent: Sep. 3, 1996

[54] SAFETY COUPLING FOR ROTARY DOWN HOLE PUMP

[75] Inventor: Robert A. R. Mills, Calgary, Canada

[73] Assignee: Kudu Industries Inc., Canada

[21] Appl. No.: 399,075

[22] Filed: Mar. 8, 1995

[51] Int. Cl.⁶ .............................. E21B 43/00; F16D 9/10
[52] U.S. Cl. .................. 166/68; 192/104 C; 188/82.1
[58] Field of Search .................. 166/68, 68.5; 192/22, 192/104 C; 418/48; 188/82.1, 71.2, 82.5

[56] References Cited

U.S. PATENT DOCUMENTS

| | | | |
|---|---|---|---|
| 2,514,228 | 7/1950 | Dodge | 192/104 |
| 3,447,650 | 6/1969 | Dossier | 192/104 CX |
| 3,662,622 | 5/1972 | Neumann | 192/22 X |
| 3,807,538 | 4/1974 | Johansson | 192/22 |
| 3,982,616 | 9/1976 | Bidanset | 192/104 |
| 4,046,240 | 9/1977 | Schlagmuller et al. | 192/104 |
| 4,216,848 | 8/1980 | Shimodaira | 188/71.2 |
| 4,687,085 | 8/1987 | Shimizu et al. | 192/104 CX |
| 4,797,075 | 1/1989 | Edwards et al. | 418/48 |
| 4,993,276 | 2/1991 | Edwards | 74/411.5 |
| 5,246,094 | 9/1993 | Arnny et al. | 192/104 CX |
| 5,257,685 | 11/1993 | Tichiaz et al. | 192/104 CX |
| 5,358,036 | 10/1994 | Mills | 166/68.5 |
| 5,362,293 | 11/1994 | Romanauskas | 192/104 CX |
| 5,370,179 | 12/1994 | Mills | 166/68.5 |

*Primary Examiner*—Frank Tsay
*Attorney, Agent, or Firm*—Andrus, Sceales, Starke & Sawall

[57] ABSTRACT

A safety coupling for preventing backspin at excessive speeds of a torque transmitting drive powering a drive shaft which stores reactive torque due to torsional stress is disclosed. The safety coupling includes a rotatable driving member to be coupled with a torque producing power source, a rotatable driven member to be coupled with the drive shaft for axial rotation therewith, a support structure for coaxially and rotatably supporting the driving and driven members in relation to each other, a radial abutment provided on the driving member, and a centrifugal force responsive pawl pivotally mounted to the driven member for releasable engagement with the abutment. The pawl is pivoted from a locking position wherein it engages the radial abutment upon mutual rotation of the driving and driven members to provide a positive driving connection therebetween, to a disengaged position wherein the driving and driven members are freely rotatable relative to each other by the centrifugal force acting thereon when the driven member is coupled to a drive shaft backspinning at a speed in excess of a selected speed. The coupling substantially prevents damage to the torque transmitting drive upon excessive back-spin of the drive shaft and reduces the risk of injury to personnel working in the vicinity of a drive shaft subject to elastic torsion.

19 Claims, 6 Drawing Sheets

SAFETY COUPLING FOR ROTARY DOWN HOLE PUMP

The present invention relates to rotary drive shafts which store reactive torque. More particularly, the invention relates to drive shafts for rotary downhole pumps, which shafts store reactive torque by reason of their large length and relatively small diameter and a head of fluid which causes the pump to become a motor when power to the drive shaft is interrupted.

BACKGROUND OF THE INVENTION

Pumping systems wherein the pump is driven by a drive shaft or drive string are subject to torsional stresses which increase with the length of the shaft or string and are stored as reactive torque in the drive train. Many pumping systems also store a head of fluid in the production tubing which exerts further torsional stress on the drive shaft. When drive power to the system is interrupted, the reactive torque is released as backspin and, if an uncontrolled release of torque occurs, personal injury and/or property damage can result. This is the case, for example, in deep well down hole rotary pumps such as progressing cavity pumps. Rotary down hole pumps have been used in water wells for many years. More recently, especially progressing cavity pumps have been found well suited for the pumping of viscous or thick fluids such as crude oil laden with sand. Rotary down hole pumps are generally driven by sucker rod drive strings which usually have a relatively small diameter of ¾ to 1⅛ inches. Such drive strings are commonly used in wells that vary from 1,500' to 6,000' in depth, 3,000' being a common average. Progressing cavity pumps include a stator which is attached to a production tubing at the bottom of a well and a rotor which is attached to a bottom end of the drive string. The elongated drive string is subject to considerable torsional force which increases with the viscosity of the liquid being pumped and the displacement of the pump. This torsional force is stored in the elongated drive string as reactive torque. Several hundreds of revolutions of torsion can be stored in the drive string with a high-capacity pump or if viscous, sand laden crude oil is being pumped. When power is interrupted to the drive string, the reactive torque is released. Unless the release of reactive torque is controlled, violent backspin of the drive string will result, especially if an electric motor is used as a power source, which when disconnected from the power supply, offers almost no resistance to reverse rotation. This can lead to costly and undesirable damage to equipment and/or/personal injury to workmen in the vicinity of the equipment.

Various braking systems have been developed which provide for a controlled release of the reactive torque stored in the drive string of down hole rotary pumps upon interruption of drive power to the drive string. These are fluid brakes or hydraulically operated brakes, such as disclosed in commonly owned U.S. Pat. No. 5,358,036, or other braking systems which operate on centrifugal braking principles (U.S. Pat. Nos. 4,216,848 to Toyohisa Shiomdaira; 4,797,075 to Wallace L. Edwards et al; and 4,993,276 to Wallace L. Edwards). Although these braking systems are all intended to control the release of reactive torque stored in the drive train, they are all subject to possible failure due to wear, exposure to the elements, accidental damage etc. If power to the drive string is interrupted and the braking system fails, uncontrolled back-spin of the drive string will occur which can result in damage not only to the drive train but also to the braking system. Even more importantly, maintenance personnel unaware of the braking system failure and relying on the system releasing any reactive torque stored in the drive string after shut-off, can be severely injured. The violent, uncontrolled back-spin of the drive string observed in the absence of braking systems or with improper or damaged braking systems has led to drive pulleys exploding, sticking up drive string ends breaking off, and electric drive motors coming apart. Thus, a back-up system is desired which would prevent damage to the equipment rotating the drive string and injury to personnel upon back-spin of pump drive shafts caused by the release of reactive torque stored therein.

SUMMARY OF THE INVENTION

It is an object of the invention to provide a relatively simple and reliable safety coupling for permitting rotation of a drive shaft in a first direction and for automatic disconnection of the shaft upon excessive counter-rotation or back-spin of the shaft caused by the release of torsion stored in the drive shaft when power to the drive shaft is interrupted.

It is a further object of the invention to provide a safety coupling for elongated pump drive strings which automatically disconnects the drive string from the power source upon excessive counter-rotation of the drive string due to the release of reactive torque stored in the elongated drive string.

It is yet another object of the invention to provide a uni-directional safety coupling for automatically disconnecting the drive string of a down hole rotary pump upon counter-rotation or back-spin of the drive string at a speed which exceeds the normal operating speed of the pump.

Accordingly, the invention provides a safety coupling for preventing back-spin at excessive speeds of a torque transmitting drive powering a drive shaft which stores reactive torque due to torsional stress, back-spin of the pump drive string being caused by the release of reactive torque due to torsional stress, back-spin of the drive shaft being caused by the release of reactive torque stored in the drive shaft upon interruption of power to the drive shaft, the safety coupling comprising,

- a rotatable driving member to be coupled with a torque producing power source;
- a rotatable driven member to be coupled with the drive shaft for axial rotation therewith;
- means for coaxially and rotatably supporting the driving and driven members in relation to each other; and
- a radial abutment provided on the driving member; and
- a centrifugal force responsive pawl mounted to the driven member for releasable engagement with the abutment. The pawl is pivotable between a locking position wherein it engages the radial abutment upon mutual rotation of the driving and driven members to provide a positive driving connection therebetween, and a disengaged position wherein the driving and driven members are freely rotatable relative to each other. The pawl is shaped and constructed to be moved from the locking position to the disengaged position by the centrifugal force acting thereon when the driven member is coupled to a drive shaft back-spinning at a speed in excess of a selected speed.

In a preferred embodiment, the invention provides a safety coupling assembly for a rotary downhole pump operated by a drive string rotatably suspended from a drive head and subject to torsional stress, comprising;

a drive spindle coupled with the drive string and axially rotatable therewith;

a rotatable driving member coupled with a torque producing power source and coaxially mounted to the drive spindle for axial rotation in relation thereto; and a one-way, non-slip centrifugal clutch for providing a driving connection between the driving member and the drive spindle when the driving member is rotated in the direction of operation of the downhole pump, and for automatically disconnecting the driving member from the drive spindle when the drive string is rotating in the opposite direction and at speeds in excess of a preselected speed.

In yet another embodiment the invention provides a safety clutch for a rotary downhole pump operated by a drive string which is suspended in the well from a drive head having a rotatable spindle for receiving a portion of the drive string, the safety clutch comprising;

a drive disk affixable to the drive spindle to be axially rotatable therewith;

a rotatable annular driving member to be coupled with a torque producing power source;

means for coaxially and rotatably supporting the driving member in relation to the drive disk;

a radial abutment provided on the driving member; and a centrifugal force responsive pawl mounted to the drive disk for releasable engagement with the abutment. The pawl is pivotable between a locking position wherein it engages the radial abutment upon mutual rotation of the driving member and the drive disk to provide a positive driving connection therebetween, and a disengaged position wherein the driving member and the drive disk are freely rotatable relative to each other. The pawl is shaped and constructed to be moved from the locking position to the disengaged position by the centrifugal force acting thereon when the drive disk is coupled to a drive shaft back-spinning at a speed in excess of a selected speed.

BRIEF DESCRIPTION OF THE DRAWINGS

The invention will now be further described by way of example only and with reference to the following drawings, wherein.

DETAILED DESCRIPTION OF THE PREFERRED EMBODIMENTS

The safety coupling in accordance with the invention is useful for disconnecting elongated drive strings, which store reactive torque due to torsional stress, from a torque transmitting drive upon excessive counter-rotation or backspin of the drive string, such as the sucker rod strings used to drive rotary down hole pumps. The safety coupling is not limited to that application and may be used in conjunction with any shaft which transmits reactive torque and back-spins when power is interrupted to the shaft. For purposes of illustration only, the safety coupling in accordance with the invention is described in conjunction with a drive head suitable for use with a sucker rod string typically used to drive a rotary down hole pump such as a progressing cavity pump.

Figure 1:
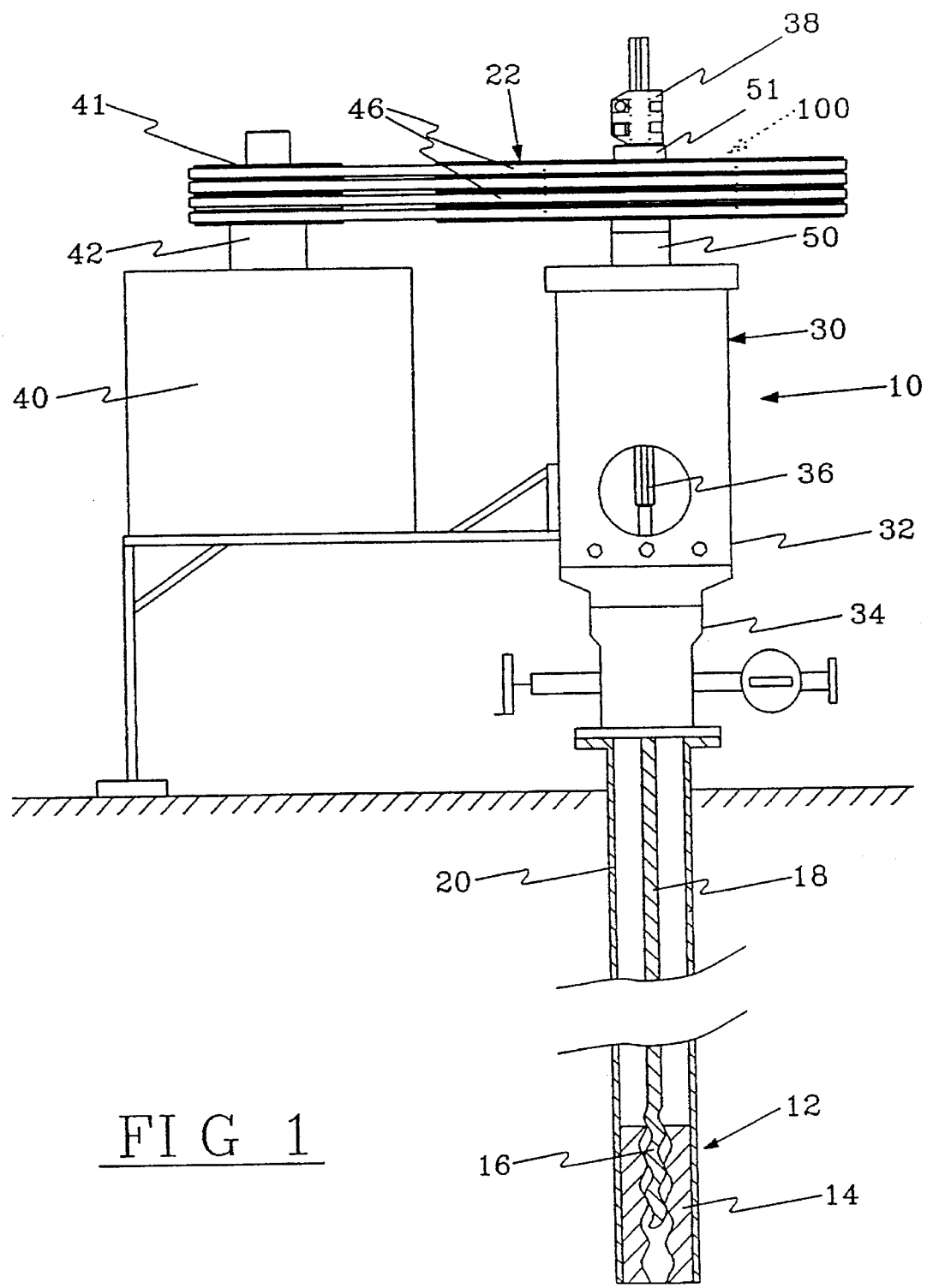
FIG. 1 is a schematic side elevational view of a rotary down hole pump arrangement which includes a safety coupling in accordance with the invention.

One preferred application of a safety coupling in accordance with the invention is illustrated in FIG. 1 which shows a rotary down hole pump drive head assembly 10 used for the operation of a progressing cavity down hole pump 12 that includes a stator 14 and a rotor 16. The rotor 16 is connected with the drive head assembly 10 by a drive string 18 which is rotatable in a production tubing or well casing 20. The rotary drive assembly 10 includes a drive head 30, the construction of which will be discussed in detail below with reference to FIGS. 4 and 5. The drive head 30 includes a housing 32 which is screwed to the top end of a well head assembly 34. The drive string 18 includes a slip shaft 36, preferably of hexagonal cross-section, which extends through and is rotated by drive head 30 as will be described below. The drive string 18 is suspended from the drive head 30 by way of a clamp 38 which is shaped to accommodate an end of the slip shaft 36 that protrudes upward from a drive spindle 50 which is rotatably mounted in the drive head 30 as will be described below in detail. The clamp 38 is fastened to the drive string above the drive spindle 50 and rests on a top surface thereof. Torque is transmitted to the drive string 18 through a torque transmitting drive 22 which includes an electric motor 40, a drive pulley 41 and the safety coupling 100. The drive pulley 41 is mounted to a drive shaft 42 of the motor 40 and the safety coupling 100 is mounted on the drive spindle 50 of the drive head 30. Multiple V-belts 46 are tensioned therearound and transfer torque from the motor 40 to the drive spindle 50. The mounting of the safety coupling 100 to the drive spindle 50 and the detailed construction of the safety coupling will be discussed in detail below. Alternatively, the drive spindle 50 may be driven by a right angle gear drive powered by an internal combustion engine (not illustrated) or a comparable torque producing power source, in a manner well known in the art.

Figure 2A:
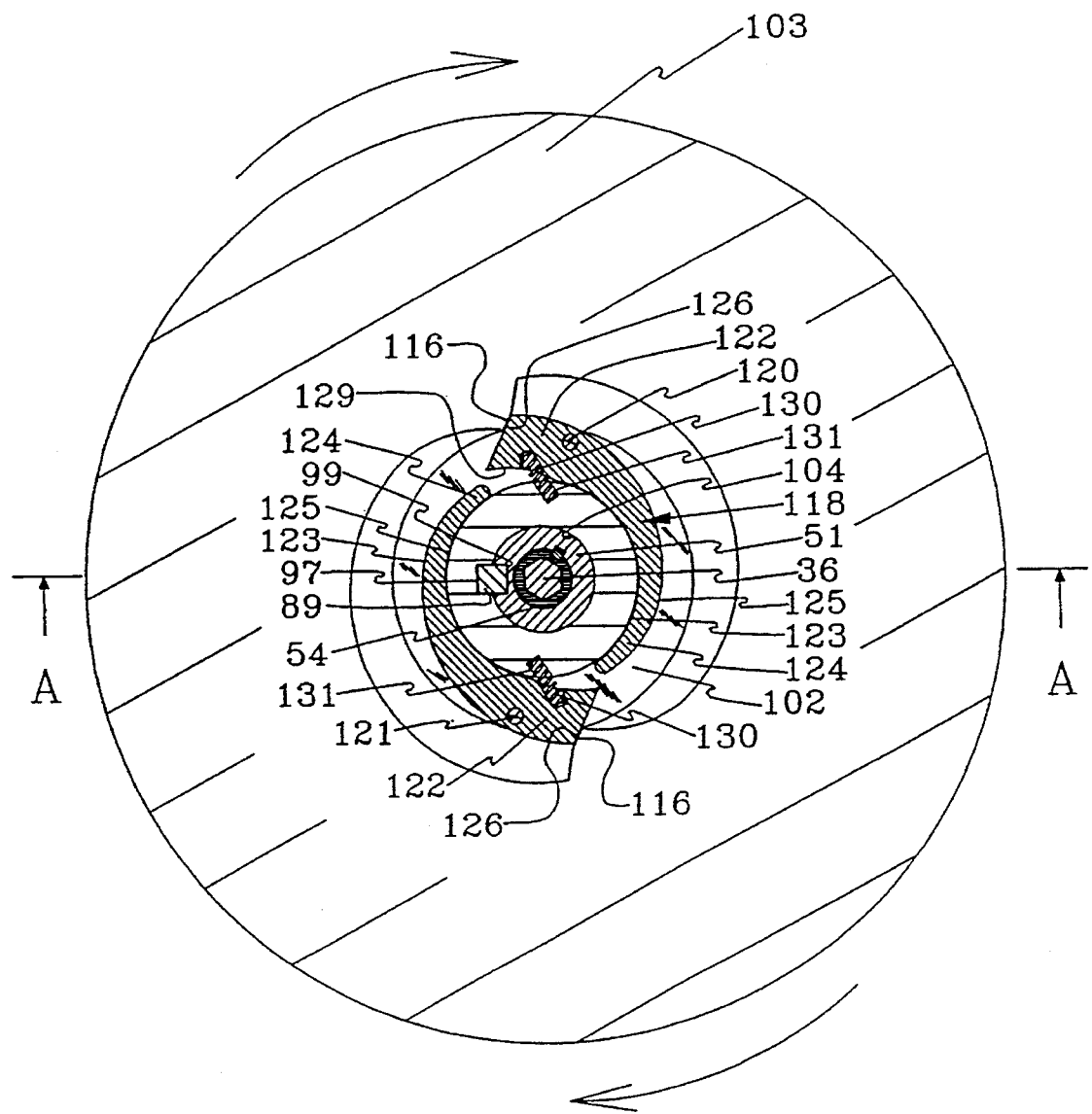
FIGS. 2A and 2B show radial cross-sections through the preferred embodiment of a safety coupling in accordance with the invention, the safety coupling being shown in the locking condition in FIG. 2A and in the disengaged condition in FIG. 2B.
Figure 2B:
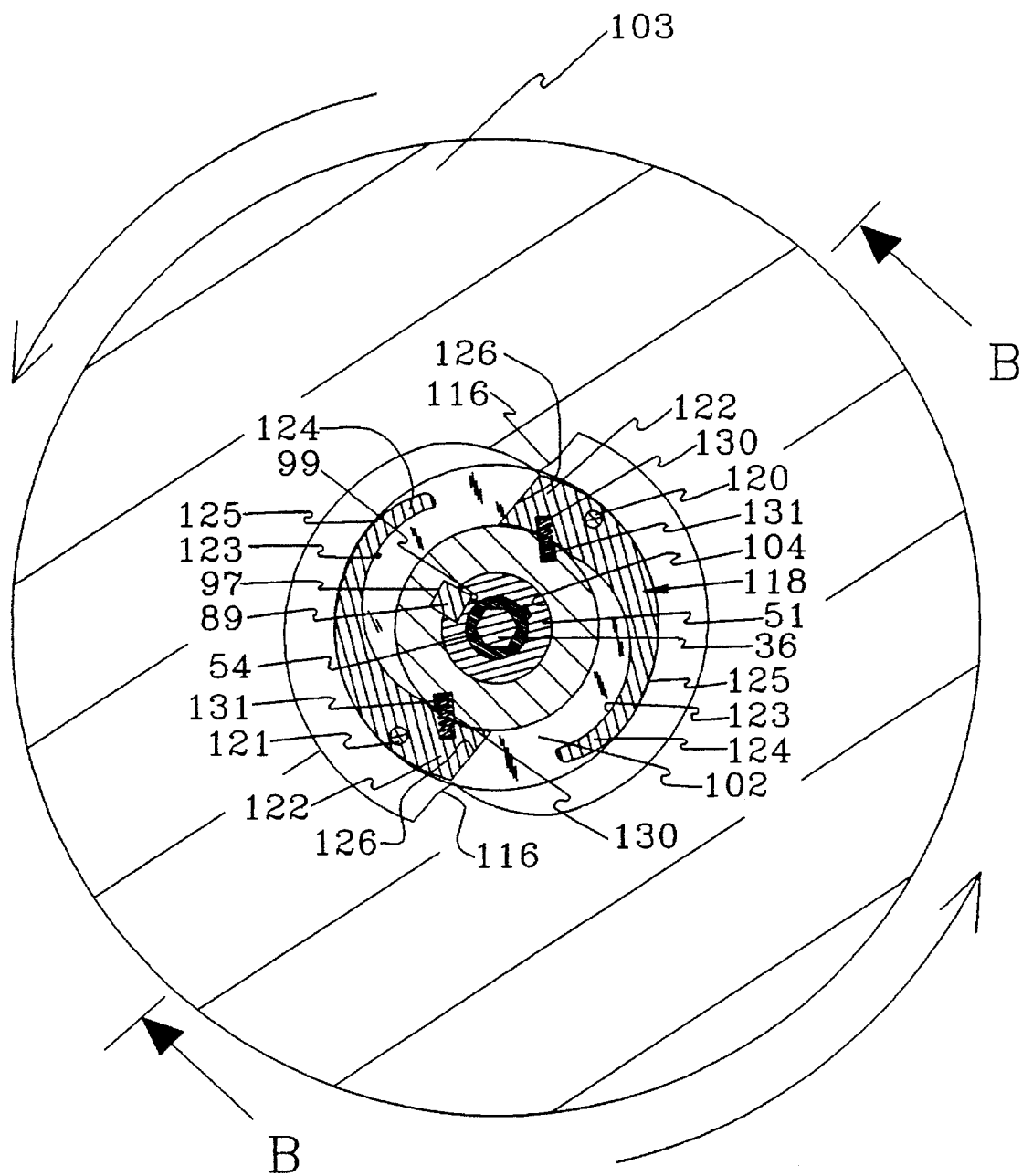
Figure 3A:
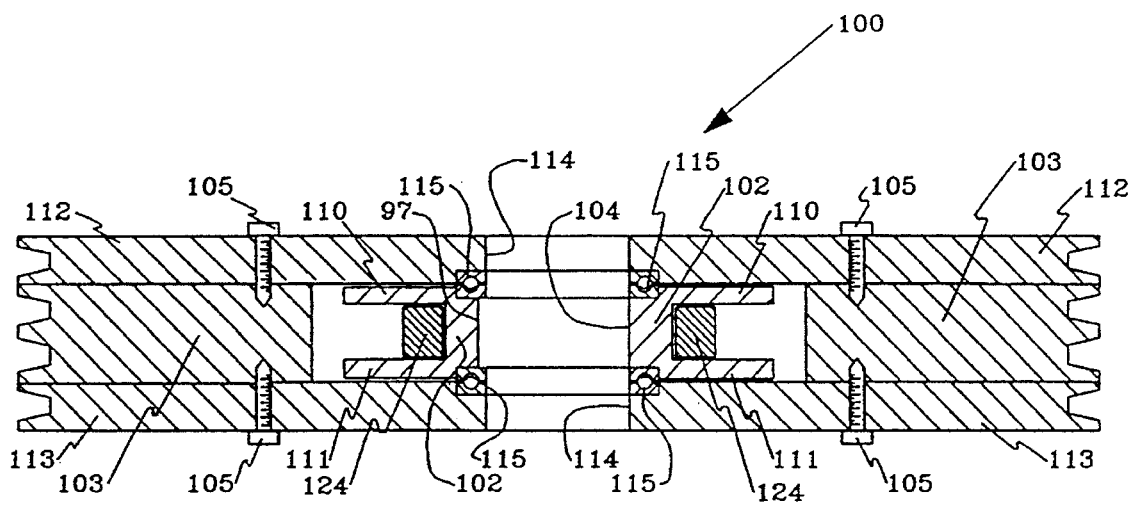
FIGS. 3A and 3B show axial cross-sections through the embodiments shown in FIGS. 2A and 2B, respectively taken along lines A—A and B—B.
Figure 3B:
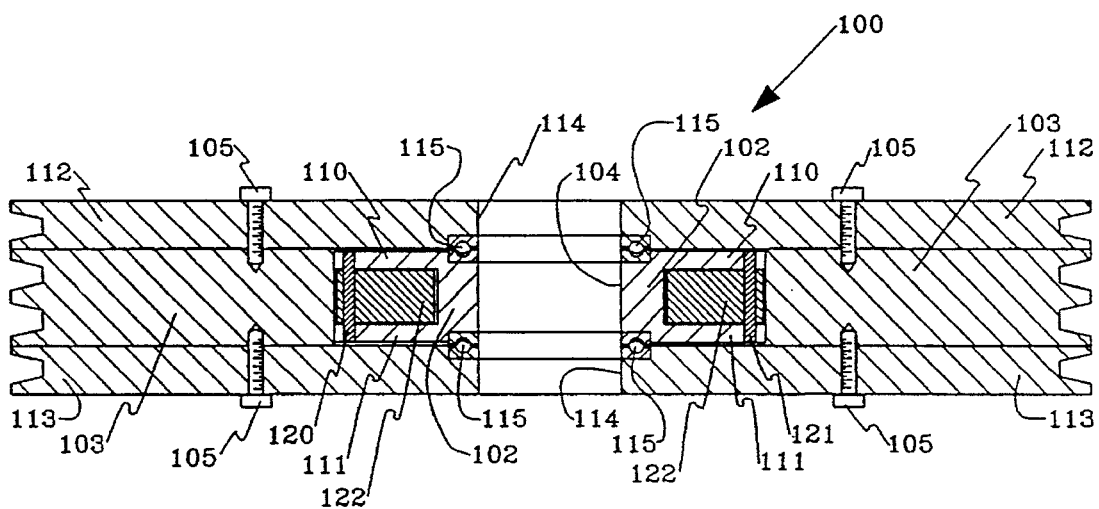

FIGS. 2A, 2B, 3A and 3B illustrate a preferred safety coupling 100 in accordance with the invention which can be mounted to the drive spindle 50 of a rotating downhole pump drive head (see FIG. 1) to replace the conventional pulley normally used for the transmission of torque from a torque producing power source, generally the aforementioned electric motor 40 (see FIG. 1), to the drive spindle 50. The safety coupling 100 includes a driven member, here a cylindrical core 102 having an axial bore 104 for fittingly receiving a top end 51 of the drive spindle 50 (see also FIGS. 4 and 5) and a driving member, here an annular poly V-groove sheave 103 surrounding the core. The sheave 103 is rotatably and coaxially fixed to the core 102 by a pair of upper and lower cover plates 112, 113, which are fastened to the sheave and also each include a circumferentially extending V-groove. The cover plates 112, 113 have an axial bore 114 of slightly larger diameter than the cylindrical bore 104 of the core 102 to fit loosely around the drive spindle 50 and permit axial rotation in relation thereto. A pair of upper and lower bearing rings 115 maintain the sheave 103 and the core 102 in coaxial alignment (see FIGS. 3A and 3B). At least one of the cover plates 112, 113 is removably fastened to the sheave 103 by a plurality of bolts 105 to permit access to the core 102. The core 102 has a pair of axially opposite flanges 110,111 respectively positioned at the upper and lower ends of the core. The sheave 103 further includes a pair of radially inwardly protruding abutments 116. A pair of pawls 118 are eccentrically mounted to the core 102 between the opposing flanges 110, 111 and pivotable about first and second pivot posts 120, 121 respectively which extend in a direction parallel to the axis of rotation of the core and are rigidly affixed to the flanges. Each pawl 118 includes a rearward portion 122 of relatively smaller mass and a forward portion 124 of relatively larger mass, which portions are respectively disposed after and before the fulcrum or pivot point, i.e. pivot posts 120, 121, of the pawl during rotation of the safety coupling in direction of operation of an associated rotary downhole pump hereinafter referred to as the forward or operating direction. The rearward portion 122 has a nose portion 126 which is engageable with one of the abutments 116 of the sheave 103. Each pawl 118 is pivotable around the respectively associated pivot post between a locking position as illustrated in FIG. 2A, wherein the nose portion 126 engages one of the abutments 116, and a disengaged position as illustrated in FIG. 2B, wherein the rearward portion 122 of the pawl is located radially inwardly of the abutments 116 so that the sheave 103 is freely rotatable about the core 102. The pawls are pivoted from the locking position to the disengaged position by the centrifugal force acting on the forward portion 124 which is larger than the centrifugal force acting on the rearward portion 122 because of the larger mass of the rear portion. A pair of helical springs 130 respectively associated with one of the pawls 118 are positioned in opposing cylindrical bores 131 provided in the rearward portion 122 of each pawl and the opposite surface of the core 102 bias the pawls to the locking position by forcing the rearward portion away from the core. Thus, in order for a pawl 118 to pivot from the locking position to the disengaged position, the centrifugal force acting on the rearward portion 124 must be sufficiently large to overcome the force of the helical spring 130 and the centrifugal force acting on the forward portion 122. It will be readily apparent that the speed of rotation of the core at which the pawls are pivoted from the locking to the disengaged position and, consequently, the driving connection between the sheave and the core is broken, can be readily adjusted by selecting a helical spring 130 of appropriate elasticity and/or a pawl of appropriate mass distribution between the forward and rearward portions. The forward portions 124 have a radially inner surface 123 which has the same curvature as the opposite surface of the core 102. The forward portions 124 further have a radially outer surface 125 which has the same curvature as the circle described by the abutments 116 during rotation of the sheave 103 relative to the core. The rearward portions 122 have a stop surface 129 (see FIG 2A) which is opposite the core 102 and curved to extend along the core when the pawls 118 are in the disengaged position. The stop surface 129 limits the pivot angle of the pawl 118 so that when the pawl is in the disengaged position the maximum radius of the circle described by the outer surface 125 of the forward portion 124 during rotation of the core 102 is always slightly smaller than the distance of the abutments 116 from the axis of rotation of the core. This reliably prevents contact of the forward portion 124 with the abutments 116 irrespective of the speed and direction of rotation of the safety coupling.

Figure 4:
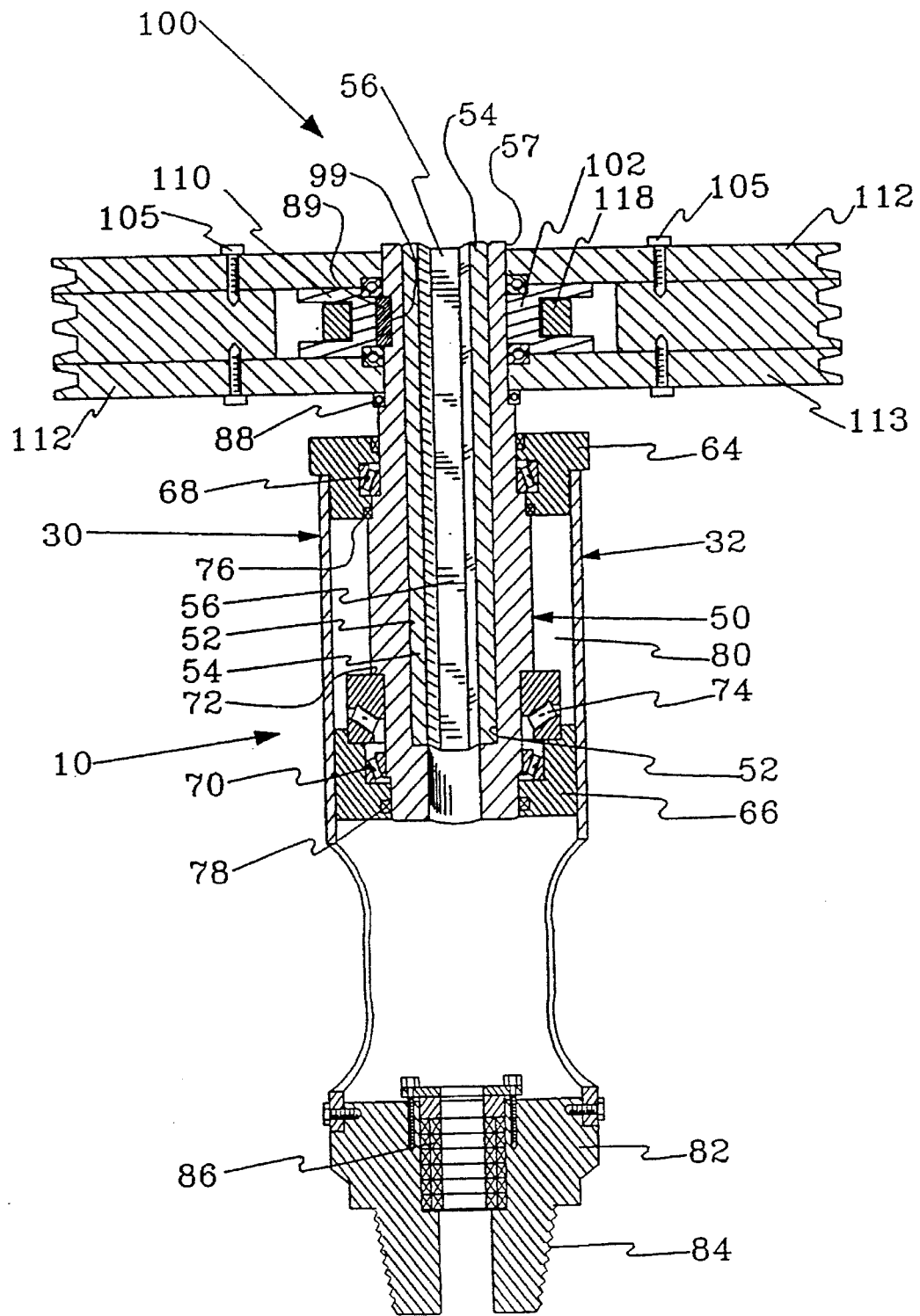
FIG. 4 is an axial cross-sectional view of the drive head of the rotary down hole pumping arrangement shown in FIG. 1 taken along the same plane as the cross-section of FIG. 3A.
Figure 5:
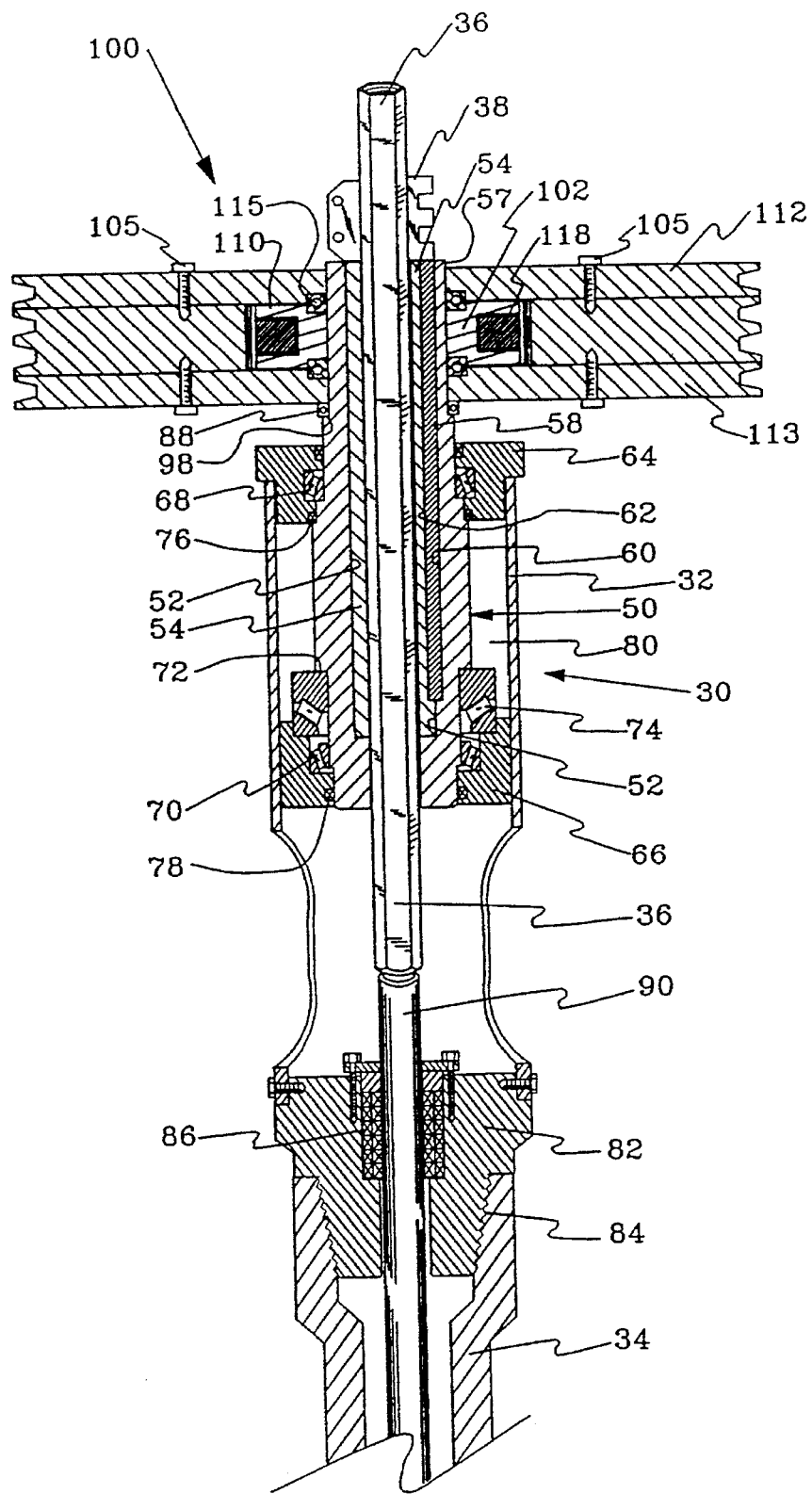
FIG. 5 is an axial cross-sectional view of the above ground portion of the pumping arrangement shown in FIG. 1 taken along the same plane as the cross-section of FIG. 3A and illustrating the polished rod and slip shaft as they extend through the drive head.

FIGS. 4 and 5 illustrate a typical drive head assembly 10, commonly used in connection with progressing cavity down hole pumps. The drive head 30 (see also FIG. 1) includes the housing 32 which accommodates a hollow drive spindle 50 having an axial cylindrical polished bore 52 sized to receive a portion of the drive string 18 of circular cross-section normally a rod 90 (see FIG. 5) affixed to the top end of the sucker rod string of the pump arrangement. Alternatively, the axial cylindrical bore 52 can be sized to receive a cylindrical drive bushing 54 with a hexagonal shaft receiving passage 56 sized to receive a hexagonal slip shaft 36 (see FIG. 5). Although the shaft receiving passage 56 and the slip shaft 36 are preferably hexagonal in cross-section other non-circular shapes which prevent rotation of the slip shaft 36 in the bushing 54 are equally useable. The diameter of the cylindrical bore 52 and the drive spindle 50 is sized to closely fit around the polished rod or the drive bushing so that polished rod wobble is prevented. Rotation of the polished rod in the spindle 50 is inhibited in a manner well known in the art and either by a dog-clutch arrangement as described by Kulhanek et al in U.S. Pat. No. 4,372,379 including a conventional polished rod clamp affixed to the polished rod and received in a complementary recess in the top end of the spindle, or a self-centering chuck-type drivehead as disclosed in the commonly owned U.S. Pat. No. 5,327,961. If a drive bushing and slip shaft of hexagonal cross-section are used, rotation of the drive bushing 54 in the cylindrical bore 52 of the drive spindle 50 is inhibited by a key 58 inserted into keyway and keyseat 60, 62 respectively provided in opposite surfaces of the drive spindle and the drive bushing. The drive spindle 50 is rotatably supported in the housing 32 by upper and lower radial bearings 68, 70 which are respectively mounted in upper and lower annular bearing mounts 64, 66 respectively screwed and relevant to the housing 32. The drive spindle 50 has an outer annular shoulder 72 which rests against the load carrying axial thrust bearing 74 mounted on the lower bearing mount 66. The axial thrust bearing 74 supports the weight of the drive spindle 50 and, thus, the drive string 18 (see FIGS. 1 and 5) suspended therefrom. Upper and lower annular seals 76, 78 positioned between the upper and lower bearing mounts 64, 66 and the drive sleeve 50, respectively seal a lubricant chamber 80, which is at least partly filled with a lubricating fluid (not shown). A bottom end 82 of the housing 32 has a conventional threaded frustoconical union 84 (NPT or API) for connecting the housing to the well head assembly 34 (see FIG. 1). The bottom end 82 of the housing 32 also includes a stuffing box 86 for providing a fluid seal between a polished rod 90 (see FIG. 5), which is part of the drive string 18, and the production tubing 20 (see FIG. 1).

Referring now to FIG. 5, during operation of the drive head 30, the slip shaft 36 in this embodiment is received in the shaft receiving passage 56 of the drive bushing 54. The shaft receiving passage 56 corresponds in size and shape to the slip shaft 36 to prevent slip shaft wobble. The polished rod 90 is screwed to the top end of the drive string 18 (see FIG. 1). The polished rod 90 extends through the stuffing box 86 which provides a fluid seal around the polished rod to inhibit the escape of hydrocarbons to the atmosphere. The slip shaft 36 is screwed onto the top end of the polished rod 60 by way of a standard polished rod box and pin thread connection well known in the art. The slip shaft clamp 38 is mounted on the slip shaft 36 directly adjacent the upper end 51 (see FIGS. 1 and 2) of the drive spindle 50 and supports the weight of the drive string 18 screwed onto the bottom end of the slip shaft by way of the intermediate polished rod 90. It should be noted that other arrangements for supporting the drive string 18 can also be used. For example, the clamp 38 can be replaced with a color and pin arrangement (not illustrated) well known in the art.

The safety coupling 100 is mounted onto the top end 51 (see FIGS. 1 and 2) of the drive spindle 50 which includes an annular shoulder 98 (see FIGS. 4 and 5) on which the safety coupling is supported by way of an intermediate bearing 88. A key 89 inserted into keyway 97 and keyseat 99 (see also FIGS. 3A, 2A and 2B) respectively provided in opposite surfaces of the core 102 and the drive spindle 50 prevents rotation of the core on the drive spindle and allows the transmission of torque from the core to the drive spindle. Multiple V-belts 46 are tensioned around the drive pulley 41 (see FIG. 1) and the sheave 103 and cover plates 112, 113 of the safety coupling 100 so that the drive spindle 50 can be rotated by way of the electric motor 40. When the construction unit of sheave 103 and cover plates 112, 113, which represents the rotatable driving member of the preferred safety coupling illustrated in FIGS. 2A, 2B, 3A and 3B, is rotated in the direction of operation of the pump, herein also referred to as the forward direction (illustrated by arrows in FIGS. 2A and 2B), the pawls 118 provide a positive driving connection between this driving member and the core 102, which represents the driven member in this preferred embodiment of the safety coupling of the invention. Thus, when the safety coupling 100 is rotated in the forward direction, torque is transmitted from the torque producing power source, here the electric motor 40, to the drive spindle 50 and, consequently, the drive shaft 18, by way of pulley 41, belts 46, and a safety coupling 100. As is apparent from FIG. 2A, torque is transmitted to the core 102 upon forward rotation of the sheave 103 by the engagement of the nose portion 126 of the rearward portion 122 of each pawl 118 with one of the abutments 116. When the supply of power to the torque producing power source is interrupted, no more torque is transmitted to the drive string 18. As a result, elastic torsion stored in the drive string 18 is released as reactive torque which leads to backspin of the drive shaft 36 and the torque transmitting drive 22, i.e. in a direction opposite the operating direction. During backspin, torque is transmitted from the core 102 coupled with the drive string 18 to sheave 103, cover plates 112, 113, belts 46, pulley 41 and electric motor 40 by engagement of the nose portions 126 with the abutments 116. Once the coupling 100 reaches the speed of rotation at which for each pawl the centrifugal force acting on the forward portion 124 exceeds the sum of the centrifugal force acting on the rearward portion 126, the force generated by helical spring 130 and the frictional force between nose portion 126 and abutment 116, the pawls are pivoted from the locking position shown in FIG. 2A to the disengaged position shown in FIG. 2B. When all pawls 118 are in the disengaged position, the driving connection between the core 102 and the sheave 103 and, consequently, the drive string and the torque transmitting drive is broken so that the drive shaft and the core can rotate freely in relation to the sheave and the torque transmitting drive 22. Thus, once the driving connection is broken, the drive string can spin out without further accelerating the sheave and torque transmitting drive which prevents backspin of the sheave, the cover plates and the torque transmitting drive at excessive speeds. This substantially avoids damage to the torque transmitting drive upon failure of the torque transmitting power source and subsequent release of the elastic torsion stored in the drive string leading to backspin of the drive shaft possibly at excessive speeds.

It will be readily appreciated that the safety coupling in accordance with the invention may be used in connection with pumping arrangements and torque transmitting drives other than those disclosed above. For example, torque transmitting drives other than the pulley-belt combination described above used for transmitting torque from the motor to the drive head can be used, such as a sprocket-chain combination or a set of intermeshed gears or any other arrangement that will permit the transmission of torque from a power source to the safety coupling and the drive sleeve 50. Torque producing power sources other than the electric motor 40 can be used, for example internal combustion engines. It will be readily appreciated that the construction of the safety coupling in accordance with the invention is not limited to two abutments 116 and pawls 118. The coupling may include any number of abutments and pawls as long as reliable disengagement of the driving connection between the sheave 103 and the core 102 at excessive backspin speeds is guaranteed. Furthermore, a safety coupling 100 in accordance with the invention may be used alone to prevent damage to the torque transmitting drive of a pump driven by a drive string subject to torsion, or in combination with a braking system as described above for added safety and as backup to the braking system. Although the preferred safety coupling described herein in detail is intended to replace the conventional pulley used in connection with downhole rotary pump drive heads, the safety coupling can be constructed with a driven member or core which is mounted to the drive spindle and a driving member or sheave which is coupled with a conventional pulley. In that arrangement, the pulley is not directly fastened to the drive spindle as in conventional drive head arrangements, but is rotatable in relation thereto.

I claim:

1. A safety coupling for preventing backspin at excessive speeds of a torque transmitting drive powering a drive shaft which stores reactive torque due to torsional stress, the drive shaft normally being rotated in a forward direction by the torque transmitting drive, and backspin of the drive shaft being caused by the release, upon interruption of power to the drive shaft, of reactive torque stored in the drive shaft due to elastic torsion of the shaft, the safety coupling comprising, a rotatable driving member to be coupled with a torque producing power source;

a rotatable driven member to be coupled with the drive shaft for axial rotation therewith;

means for coaxially and rotatably supporting the driving and driven members in relation to each other;

a radial abutment provided on the driving member; and a centrifugal force responsive pawl pivotally mounted to the driven member for releasable engagement with the abutment, the pawl being pivotable between a locking position wherein it engages the radial abutment upon mutual rotation of the driving and driven members to provide a positive driving connection there between, and a disengaged position wherein the driving and driven members are freely rotatable relative to each other; the pawl being shaped and constructed to be moved from the locking position to the a disengaged position by a centrifugal force acting thereon when the driven member is coupled to the drive shaft and the drive shaft is backspinning at a speed in excess of a selected speed.

2. A safety coupling as defined in claim 1, wherein the abutment and the pawl are shaped and constructed so that, when the driving member is rotating in the forward direction and at a speed below the selected speed, the pawl engages the abutment, thereby providing a positive driving connection between the driving member and the driven member, whereas when the driving member is back-spinning together with the drive shaft, the pawl is forced to the disengaged position by the abutment whenever the pawl passes the abutment, so that no driving connection is possible between the driving and driven members irrespective of their speed of rotation.

3. A safety coupling as defined in claim 1, wherein the pawl has a fulcrum and forward and rearward portions respectively positioned before and after the fulcrum of the pawl when the driven member is rotated in the forward direction which corresponds to a direction of operation of the associated drive shaft, the rearward portion having a nose portion for engagement with the abutment and the forward portion having a relatively larger mass than the rearward portion so that the pawl is pivoted from the locking position to the disengaged position when, upon backspin of the driven member in a direction opposite to the forward direction and above the selected speed, the centrifugal force acting on the forward portion is larger than the centrifugal force acting on the rearward portion and any frictional forces present between the abutment and the nose portion.

4. A safety coupling as defined in claim 3, wherein the safety coupling further includes biasing means for forcing the pawl into the locking position, and the mass of the forward portion is selected so that the centrifugal force acting on the forward portion upon backspin at the selected speed balances the centrifugal force acting on the rearward portion, any frictional forces present between the abutment and the nose portion and the biasing force of the biasing means.

5. A safety coupling as defined in claim 4, wherein the biasing means is a helical spring positioned in opposing bores provided in opposite surfaces of the driven member and the rearward portion of the pawl.

6. A safety coupling as defined in claim 1, wherein the driving member includes a pair of diametrically opposite abutments, and the driven member includes a pair of pawls pivotally mounted to the driven member at diametrically opposite locations.

7. A safety coupling as defined in claim 3, wherein the driving member includes a plurality of diametrically opposed pairs of abutments, and the driven member includes a pair of pawls pivotally mounted to the driven member at diametrically opposite locations adjacent abutments being spaced apart to permit placement of the nose portion of one of the pawls therebetween.

8. A safety coupling as defined in claim 7, wherein the means for supporting includes a pair of axially opposite, spaced apart radial flanges provided on the driving member and a pair of bearings respectively positioned between one of the pair of flanges and an opposing surface of the driven member.

9. A safety coupling as defined in claim 8, further including a means for limiting the movement of the pawls in the disengaged position so that the rearward portion of the pawl does not come into contact with the abutment when the forward portion is disengaged therefrom upon back-spinning of the driven member at a speed in excess of the selected speed.

10. A safety coupling assembly for a rotary downhole pump rotated in a forward direction by a drive string rotatably suspended from a drive head and subject to elastic torsion, comprising a drive spindle coupled with the drive string and axially rotatable therewith;

a rotatable driving member coupled with a torque producing power source and coaxially mounted to the drive spindle for axial rotation in relation thereto; and a one-way, non-slip centrifugal clutch for providing a driving connection between the driving member and the drive spindle when the drive spindle is rotated in the forward direction and for automatically disconnecting the driving member from the drive spindle when the drive string is backspinning in the opposite direction and at speeds in excess of a selected speed upon interuption of power to the driving member and subsequent release of the elastic torsion stored in the drive string.

11. A safety coupling assembly as defined in claim 10, wherein the one way non-slip centrifugal clutch includes a rotatable driven member to be coupled with the drive spindle for axial rotation therewith;

means for coaxially and rotatably supporting the driving and driven members in relation to each other;

a radial abutment provided on the driving member; and a centrifugal force responsive pawl mounted to the driven member for releasable engagement with the abutment, the pawl being pivotable between a locking position wherein it engages the radial abutment upon mutual rotation of the driving and driven members to provide a driving connection therebetween, and a disengaged position wherein the driving and driven members are freely rotatable relative to each other, the pawl being shaped and constructed to be moved from the locking position to the disengaged position by the centrifugal force acting thereon when the driven member is coupled to the drive spindle and the drive string is backspinning at a speed in excess of the selected speed.

12. A safety coupling assembly as defined in claim 11, wherein the means for supporting includes a pair of axially opposite, spaced apart radial flanges provided on the driving member and a pair of bearings respectively positioned between one of the pair of flanges and an opposing surface of the driven member.

13. A safety coupling assembly as defined in claim 12, wherein the pawl has a fulcrum and forward and rearward portions respectively positioned before and after the fulcrum of the pawl when the driven member is rotated in the forward direction which corresponds to a direction of operation of the associated drive shaft, the coupling assembly further including means for limiting the movement of the pawl in the disengaged position so that the rearward end of the pawl does not come into contact with the abutment when the forward portion is disengaged therefrom upon back-spinning of the driven member at a speed in excess of the selected speed.

14. A safety coupling assembly as defined in claim 13, wherein the abutment and the pawl are shaped and constructed so that, when the driving member is rotating in the forward direction, the pawl engages the abutment, thereby providing a positive driving connection between the driving member and the driven member, whereas when the driving member is back-spinning in relation to the driven member, the pawl is forced to the disengaged position by the abutment whenever the pawl passes the abutment, so that no driving connection is possible between the driving and driven members irrespective of their speed of rotation.

15. A safety coupling as defined in claim 11, wherein the pawl has a fulcrum and forward and rearward portions respectively positioned before and after the fulcrum of the pawl when the driven member is rotated in the forward direction which corresponds to a direction of operation of the associated drive shaft, the rearward portion having a nose portion for engagement with the abutment and the forward portion having a relatively larger mass than the rearward portion so that the pawl is pivoted from the locking position to the disengaged position when, upon backspin of the driven member in a direction opposite to the forward direction and above the selected speed, the centrifugal force acting on the forward portion is larger than the centrifugal force acting on the rearward portion and any frictional forces present between the abutment and the nose portion.

16. A safety coupling as defined in claim 15, wherein the safety coupling further includes biasing means for forcing the pawl into the locking position, and the mass of the forward portion is selected so that the centrifugal force acting on the forward portion upon backspin at the selected speed balances the centrifugal force acting on the rearward portion, any frictional forces present between the abutment and the nose portion and the biasing force of the biasing means.

17. A safety coupling as defined in claim 16, wherein the biasing means is a helical spring positioned in opposing bores provided in opposite surfaces of the driven member and the rearward portion of the pawl.

18. A safety coupling as defined in claim 11, wherein the driving member includes a pair of diametrically opposite abutments, and the driven member includes a pair of pawls pivotally mounted to the driven member at diametrically opposite locations.

19. A safety clutch for a rotary downhole pump operated by a drive string which is suspended in the well from a drive head having a rotatable spindle for receiving a portion of the drive string, the safety clutch comprising a drive disk affixable to the drive spindle to be axially rotatable therewith;

a rotatable annular driving member to be coupled with a torque producing power source and mounted to the drive disk for coaxial rotation in relation thereto;

means for coaxially and rotatably supporting the driving member and the drive disk in relation to each other;

a radial abutment provided on the driving member; and centrifugal force responsive pawl mounted to the drive disk for releasable engagement with the abutment, the pawl being pivotable between a locking position wherein it engages the radial abutment upon mutual rotation of the driving member and the drive disk to provide a positive driving connection therebetween, and a disengaged position wherein the driving member and the drive disk are freely rotatable relative to each other; the pawl being shaped and constructed to be moved from the locking position to the disengaged position by the centrifugal force acting thereon when the drive disk is coupled to the drive string and the drive string is backspinning at a speed in excess of a selected speed.

* * * * *